US010805250B2

(12) United States Patent
Pratt et al.

(10) Patent No.: US 10,805,250 B2
(45) Date of Patent: *Oct. 13, 2020

(54) METHOD AND SYSTEM FOR PROVIDING A COLLABORATIVE EVENT-SHARE SERVICE

(71) Applicant: AT&T Intellectual Property I, L.P., Atlanta, GA (US)

(72) Inventors: James Pratt, Round Rock, TX (US); Marc Sullivan, Austin, TX (US); Sarah Peterson Everett, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,111

(22) Filed: Dec. 28, 2018

(65) Prior Publication Data
US 2019/0140991 A1   May 9, 2019

Related U.S. Application Data

(63) Continuation of application No. 14/512,955, filed on Oct. 13, 2014, now Pat. No. 10,171,393, which is a (Continued)

(51) Int. Cl.
*H04L 12/58* (2006.01)
*G06Q 10/06* (2012.01)

(52) U.S. Cl.
CPC ............. *H04L 51/10* (2013.01); *G06Q 10/06* (2013.01)

(58) Field of Classification Search
CPC ..... H04L 67/306; H04L 65/403; H04L 67/10; H04L 67/18; H04L 51/32; H04L 67/26; H04L 67/22; H04L 63/08; H04L 63/102; H04L 12/1822; H04L 51/04; H04L 51/046; H04L 65/4076; H04L 65/601; H04L 65/605; H04L 67/02; H04L 67/025; H04L 67/42; H04L 51/36; H04L 63/104; H04L 65/1089; H04L 65/4015; H04L 63/10; H04L 67/06; H04L 51/24; H04L 63/0428; H04L 67/1095; H04L 67/24; H04L 12/1859; H04L 12/1895; H04L 2209/56; H04L 65/083; H04L 63/0869; H04L 63/168; H04L 12/4015; H04L 9/14; H04L 9/3226; H04L 12/1813; H04L 2209/80; H04L 43/10; H04L 51/10; H04L 51/16; H04L 63/065; H04L 63/067;
(Continued)

(56) References Cited

U.S. PATENT DOCUMENTS

| 2004/0255321 | A1 | 12/2004 | Matz |
| 2005/0002648 | A1 | 1/2005 | Hoshino et al. |
| 2006/0046755 | A1 | 4/2006 | Kies |
| 2006/0080432 | A1* | 4/2006 | Spataro ............... H04L 12/1831 709/224 |
| 2006/0117010 | A1 | 6/2006 | Hakala |

(Continued)

*Primary Examiner* — Djenane M Bayard

(57) ABSTRACT

A method, a system and a computer readable medium for supporting collaborative media sharing among users at an event are disclosed. For example, the method creates an event-share group relating to an event, and provides an event tag to a plurality of members of the event-share group, where the event tag uniquely identifies the event-share group or the event. The method receives a captured media from at least one of the plurality of members, wherein the event tag is attached to the captured media and provides the captured media to the plurality of members.

20 Claims, 4 Drawing Sheets

Related U.S. Application Data continuation of application No. 12/647,539, filed on Dec. 27, 2009, now Pat. No. 8,862,663.

(58) Field of Classification Search
CPC . H04L 63/0823; H04L 63/0861; H04L 63/18; H04L 67/1097; H04L 67/20; H04L 9/0819; H04L 9/0861; H04L 9/321; H04L 9/3228; H04L 12/1818; H04L 2209/38; H04L 2463/061; H04L 65/607; H04L 47/15; H04L 51/02; H04L 63/0236; H04L 63/101; H04L 65/1069; H04L 65/60; H04L 65/602; H04L 67/1076; H04L 67/12; H04L 67/34; H04L 29/06; H04L 51/043; H04L 51/20; H04L 61/1541; H04L 63/083; H04L 63/0876; H04L 63/105
See application file for complete search history.

(56) References Cited

U.S. PATENT DOCUMENTS

| | | | |
|---|---|---|---|
| 2006/0259493 A1* | 11/2006 | Liang | G06F 16/958 |
| 2007/0033142 A1* | 2/2007 | Patten | G06Q 10/10 705/51 |
| 2008/0318610 A1 | 12/2008 | Bhaskaran et al. | |
| 2009/0089352 A1* | 4/2009 | Davis | G06Q 10/00 709/201 |
| 2009/0216859 A1 | 8/2009 | Dolling | |
| 2010/0029326 A1 | 2/2010 | Bergstrom | |
| 2010/0057555 A1 | 4/2010 | Butterfield et al. | |
| 2011/0028083 A1* | 2/2011 | Soitis | G11B 27/10 455/3.06 |
| 2011/0029610 A1 | 2/2011 | Chao et al. | |
| 2011/0055935 A1* | 3/2011 | Karaoguz | G06F 21/10 726/29 |

* cited by examiner

METHOD AND SYSTEM FOR PROVIDING A COLLABORATIVE EVENT-SHARE SERVICE

This application is a continuation of U.S. patent application Ser. No. 14/512,955, filed Oct. 13, 2014, now U.S. Pat. No. 10,171,393, which is a continuation of U.S. patent application Ser. No. 12/647,539, filed Dec. 27, 2009, now U.S. Pat. No. 8,862,663, all of which are herein incorporated by reference in their entirety.

The present disclosure relates generally to communication networks and, more particularly, to a method and system for supporting and enabling collaborative media sharing among users, e.g., at an event.

BACKGROUND

Wireless network providers currently enable users to capture media on wireless endpoint devices and to share the media with others. For example, many mobile phones are now equipped with integrated digital cameras for capturing still pictures and short video clips. In addition, many mobile phones are equipped to also store audio recordings. Wireless network providers allow users to send picture, video or audio files to other users on the same wireless network or even on different networks. Thus, a user at an event, such as a parent at a child's soccer game, could take photographs of the child in the game using a mobile phone and send the pictures almost immediately via the wireless network to the user's spouse or other relatives who may have been unable to attend the game in person.

In addition, a user may accumulate large amounts of media that may exceed the local storage capacity of the user's wireless endpoint device. Of course, a user may also choose to store such media onto a server, e.g., in a local area network, on the user's home computer or laptop, on a compact disc, on an external drive, and/or in other locations and storage media. In each case, a user may also choose to share the media with other users. For example, the user may send pictures or video as email attachments, or may send a link with a URL for the location of the media via email or instant message to other users. However, the user must know beforehand the other users with whom the user wishes to share the media and must know how to reach the other users, e.g., via an email address, a telephone number, a mobile phone number, etc.

SUMMARY

In one embodiment, the present disclosure discloses a method, a system and a computer readable medium for supporting collaborative media sharing among users at an event. For example, the method creates an event-share group relating to an event, and provides an event tag to a plurality of members of the event-share group, where the event tag uniquely identifies the event-share group or the event. The method receives a captured media from at least one of the plurality of members, wherein the event tag is attached to the captured media and provides the captured media to the plurality of members.

In another embodiment, the method transmits a request to participate in an event-share group relating to an event, and receives an event tag which uniquely identifies the event-share group or the event. The method transmits a captured media to an application server deployed in the communication network, wherein the event tag is attached to the captured media.

In yet another embodiment, the method transmits a request to participate in an event-share group relating to an event, and receives an event tag which uniquely identifies the event-share group or the event. The method receives captured media from an application server deployed in the communication network, wherein the event tag is attached to the captured media.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a system and a computer readable medium for supporting and enabling collaborative media sharing among users, e.g., at an event. Although the present disclosure is discussed below in the context of wireless access networks and Internet Protocol (IP) Multimedia Subsystem (IMS) networks, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, cellular networks, wireless networks, and the like.

Figure 1:
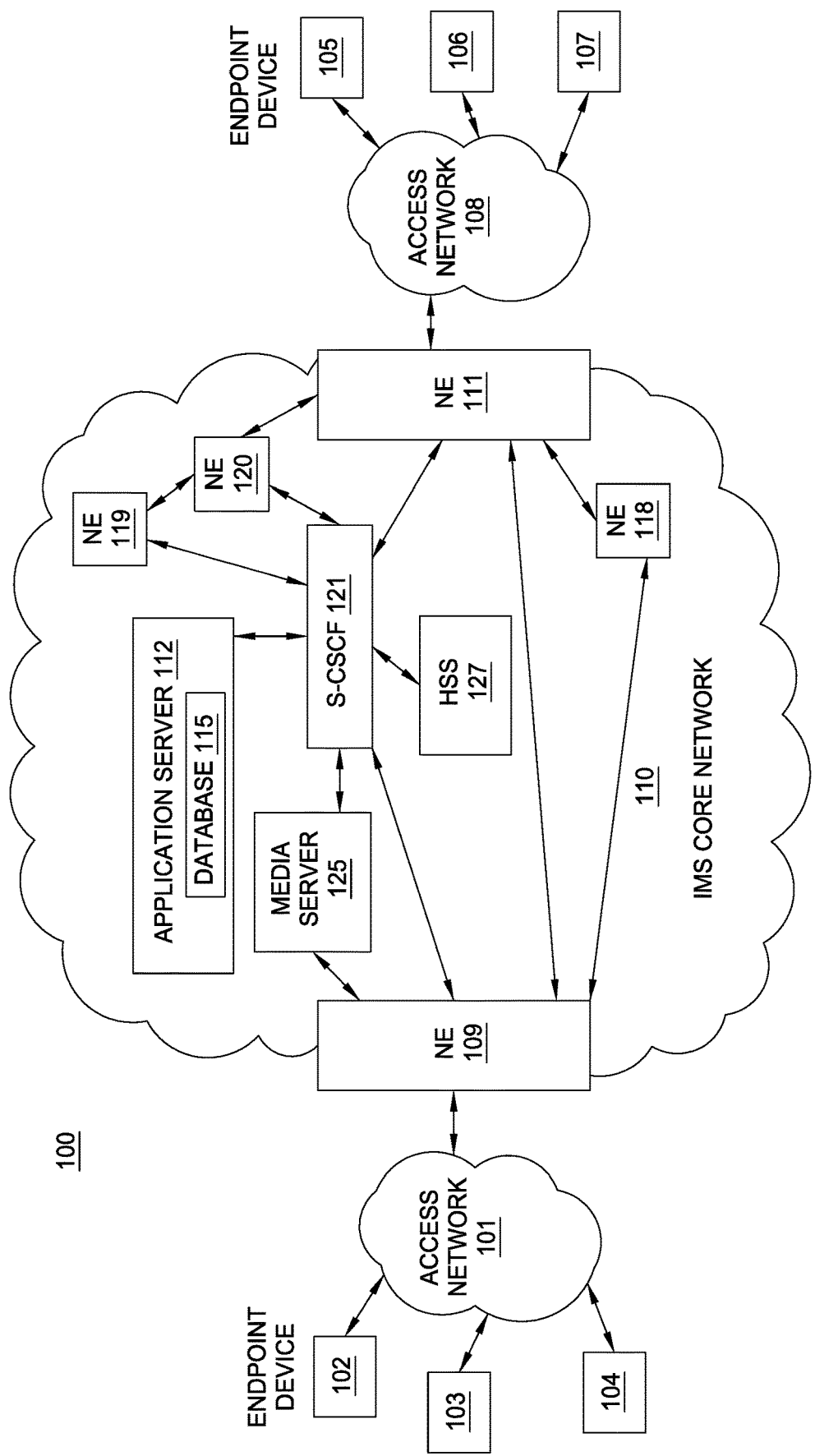
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, cellular phones, smart phones, email devices, messaging devices, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving—Call Session Control Function (S-CSCF) 121, a Media Server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The MS 125 also interacts with customers for media session management to accomplish tasks such as process requests.

The application server 112 may comprise any server or computer that is well known in the art, and the database 115 may be any type of electronic collection of data that is also well known in the art. In one embodiment, the application server 112 may comprise an event-share server that is configured to support and enable collaborative media sharing among users, e.g., at an event (e.g., to create and maintain one or more event-share groups). Accordingly, in one embodiment the database 115 may store event-share media and tags to support and enable collaborative media sharing among users, e.g., at an event, as discussed in greater detail below. Those skilled in the art will realize that the communication system 100 may be expanded by including additional endpoint devices, access networks, network elements, application servers, etc. without altering the scope of the present disclosure.

The above IP network is only described to provide an illustrative environment in which packets for voice, data and/or multimedia services are transmitted on networks. In one embodiment, the current disclosure discloses a method and system for supporting and enabling collaborative media sharing among users, e.g., attending an event via an exemplary communication network (e.g., an IMS core network) as illustrated in FIG. 1 and as further described below.

Figure 2:
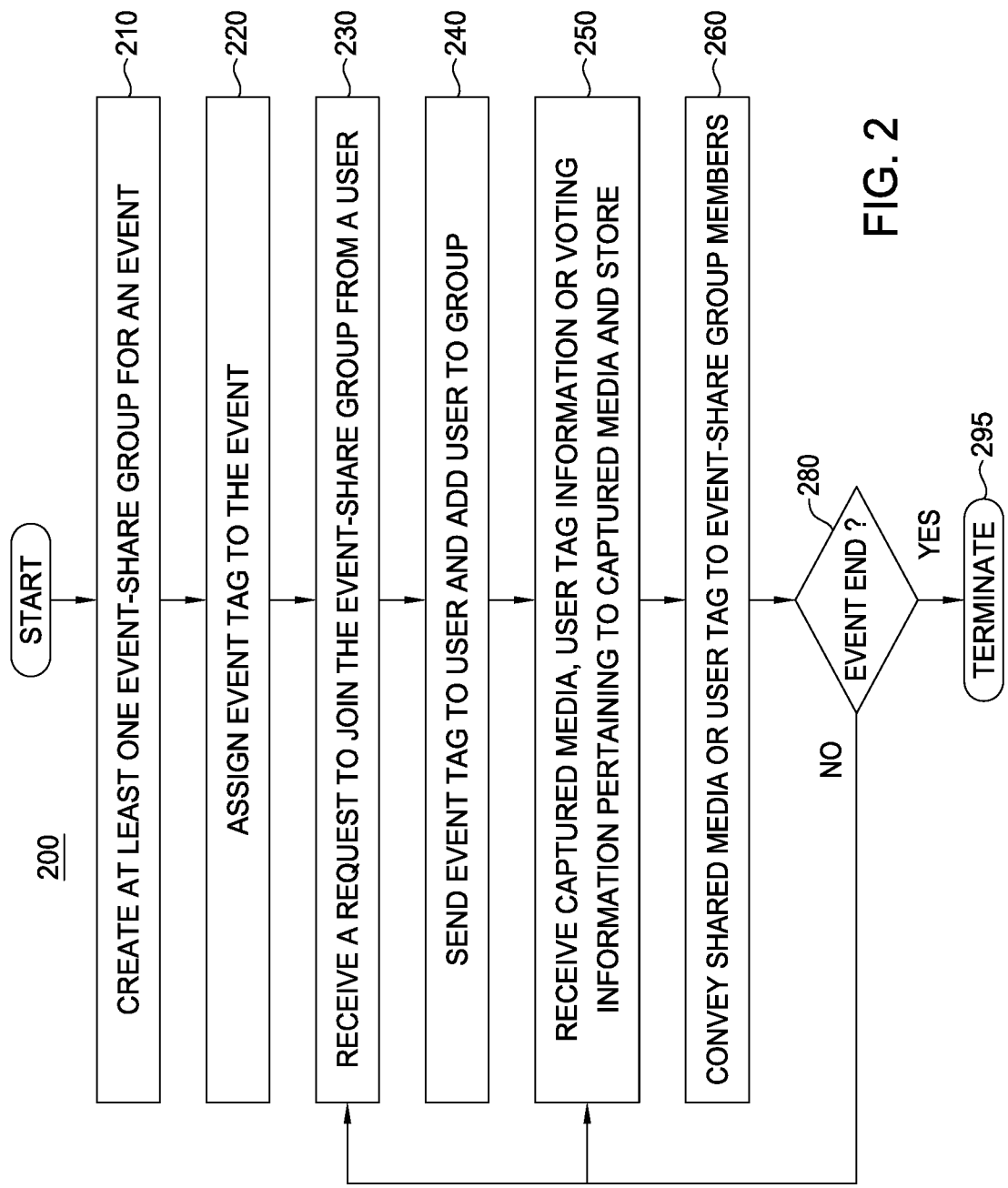
FIG. 2 illustrates a flowchart of a method for creating and maintaining a collaborative event-share group.

FIG. 2 illustrates a flowchart of a method 200 for supporting and enabling collaborative media sharing among users, e.g., at an event. In one embodiment, one or more steps of the method 200 can be performed by one or more of the components of IMS core network 110. For example, in one embodiment one or more steps of the method 200 can be implemented by S-CSCF 121 or an event-share server such as AS 112. The method begins in step 205 and proceeds to step 210.

At step 210, the method creates at least one event-share group for an event. For example, a network provider may provide an event-share service feature which is a feature that permits users who have subscribed to the feature to participate in temporary event-share groups for sharing media with other users who are members of the same temporary group.

For example, a user may be attending a child's soccer game and would like to participate in event media sharing for that game (i.e., the "event") using his or her mobile endpoint device (e.g., a cellular phone, a mobile phone, a smart phone, and the like). Accordingly, the method may receive a request from the user (e.g., via his or her mobile endpoint device) to participate in an event-share group for the soccer game. In one embodiment, the method first verifies or confirms that the user has subscribed to an event-share service feature. If not, the request is denied. On the other hand, if the method determines that the user has subscribed to the event-share service feature, the method may determine if the user is the first user requesting to participate in an event-share group for the particular event. In one embodiment, if the method determines that the user is the first user requesting to participate in an event share group for a particular event, the method creates a new event-share group with the requesting user being the first member. Alternatively, organizers of an event such as a major sporting event or concerts may provide advance notice of the event and the method may automatically set-up an event-share group for the event. Various other scenarios and mechanisms for creating a new event-share group are possible and are within the scope of the present disclosure.

Regardless of the manner in which an event-share group is created, the method 200 proceeds to step 220 where the method assigns an event tag to the event and/or event-share group for use by members of the event-share group. The event tag may comprise any identifier that is attached to or stored with media that uniquely identifies the media as being related to a particular event and/or event-share group. In this manner, media that is tagged with the particular event tag (e.g., the event tag is attached to or stored with the media) can be easily identified as media belonging to a particular event, and/or event-share group. In one embodiment, an event tag may comprise access type information on a picture, or correlated type information that is stored with a media file, such as a video. In one embodiment, an event tag may comprise watermarking type information on the media itself that could be encoded in, and transmitted with the media itself, or alongside the media. Alternatively, an event tag could be simply a text tag that is stored in an access file along with the media. In one embodiment, the event tag may be hidden information in a picture that may be detected by the method and made available to other systems. In the case of music or audio files, the event tag may comprise identifying information stored in a standard format, such as audio watermarking and the like.

In one embodiment, a plurality of user mobile endpoint devices is configured to capture pictures in EXIF (Exchangeable Image File Format). Under the EXIF standard, a picture has associated JPEG (Joint Photograph Experts Group standard) fields. In one embodiment, tag information (e.g., event tag information) is included in one or more of the JPEG fields. Alternatively, or in addition, in one embodiment a user definable field is created and configured to be populated with event tag information. This allows greater flexibility in customizing the event tags to effect event-sharing methods in accordance with the disclosure, and provides greater user-friendliness to users that are using the event tags.

At step 230, the method 200 receives a request to join the event-share group from a user. For example, a user may arrive at an event and be attempting to join an event-share group for the event. An event-share group may have already been created if the user is not the first user at the event requesting to participate in an event-share group.

In one embodiment, the method may provide a number of choices to the user, e.g., a text message with a menu showing a plurality of event-share groups at an event or location. The user may then select one of the existing event-share groups provided in the menu. For example, the user may be attending a child's soccer game at a large park with many nearby soccer fields with several different games taking place at the same time. In this example, there may be several likely choices for the event identified by the method for presentation to the user. For example, in one embodiment, the method may identify likely event-share groups that the user may want to join based on the approximate location of the user. To illustrate, the method may obtain the user's location information in various ways, such as via a Global Positioning System (GPS) receiver deployed in the user's mobile endpoint device, triangulation via cell towers, and the like. Thus, the method may estimate the location of the user based upon particular base station(s) serving the user, based upon other nearby mobile endpoint devices that are in the same event-share group, or by receiving direct user input as to street addresses or physical coordinates (e.g., longitude, latitude).

In one embodiment, the method may alternatively, or additionally, identify potential event-share groups that the user would like to join based upon keywords that the user may include with the request to participate in event media sharing. For example, the user may include in the request to join an event-share group using the term "soccer field 1 in Central Park", the name of the town where the game is taking place, the name of an arena or stadium, a section of seats in an arena or stadium, the name of an event (e.g., Oktoberfest in Munich, Super Bowl, World Series, and the like), and/or the name of the team. In this manner, the method is likely to identify the correct event or substantially narrow the possible choices to a select few possibilities.

In certain situations, a user requesting to join an event-share group for an event may appear to be the first user requesting to participate with respect to a particular event because the user may, for example, submit a request including the name of his or her child's team only. However, there may already be an event-share group set-up for the event that is related to the team name of the opposing team as a keyword. Accordingly, in one embodiment the method may determine that it is likely that two different existing event-share groups are related to the same event. For example, the method may detect similar tagging attributes, such as text descriptions, similar pictures using various picture attribute comparison algorithms, etc. In this case, the method may provide a choice to a new user requesting to participate in event-sharing for an event whether two or more event-share groups being presented should be combined into a single event. For example, a user requesting to join an event-share group related to a soccer game may be presented with a choice of two groups (e.g., team "blue" event-share group and team "yellow" event-share group), or an alternative option of creating a combined group (e.g., a "team blue versus team yellow" event-share group). In one embodiment, the method may not join two existing event-share groups unless a predetermined number of new users attempting to join either group indicate that the event-share groups should be combined.

In step 240, the method 200 adds the user requesting to join an event-share group to an existing event-share group as a new member and provides the event tag created for the event-share group to the user. This allows a user's mobile endpoint device to tag captured media as being associated with the event-share group.

In one embodiment, the event tag, as it appears to a user on the user's device, is represented in a user-customizable format. For example, the user device may maintain a mapping to a universal event tag that allows the method to correlate all the event tags related to a single event. In such an embodiment, the user may use an event tag or otherwise selectively personalize an event as "John's soccer game," while another group member may identify the same event as "Joe's soccer game." Since the event is the same event, and each user is participating in the same event-share group, whenever media or user tags are transmitted, the universal event tag is included by a user's device, while on the other users' devices, the event tags are presented to the other users (e.g., via respective user interfaces) in the format(s) that the other users prefer (e.g., "John's soccer game").

The method 200 then proceeds to step 250 where the method receives and stores captured media, user tag information pertaining to shared media (i.e., captured media that is made available and shared among other group members) or voting information pertaining to shared media. For example, any user in the event-share group may capture new media relating to a subject event and may desire to share the media with other members of the group. The captured media may comprise digital still photographs, video, audio clips, and other media. The media may be captured by a group member via his or her mobile endpoint device (e.g., a cellular phone, mobile phone, smart phone and the like) which may be equipped with a picture and video camera in addition to a microphone for capturing speech and other audio signals.

In one embodiment, a group member may indicate his or her intention to share the captured media by transmitting an email or SMS or MMS message to an address designated for receiving event-share media with the media comprising an attachment to the message. In one embodiment, the group member's mobile endpoint device is configured to automatically add event tag information to the captured media. By including event tag information in the captured media, the method can quickly distinguish which event-share group the media pertains to. As mentioned above, the event tag may comprise any identifier that is attached to or included with media that uniquely identifies the particular event-share group to which the captured media relates. Accordingly, the method may identify the correct event-share group to which the captured media relates and store the media in a suitable manner.

At step 250, the method 200 may also receive user tag information pertaining to captured or shared media. Specifically, the method may allow members of an event-share group to add their own user tags to the captured or shared media. Note, however, that user tags are different than the universal event tag that is attached to all media shared among members of the event-share group. For example, the user tag may comprise information that is customizable by a member of an event-share group and which is presented to other group members whenever the media to which the user tag is attached is presented/displayed. The user tags may comprise information stored in an access portion of a picture file, or correlated type information that is stored with a media file, such as a video.

In one embodiment, a user tag may comprise watermarking type information on the media itself that could be encoded in and transmitted along with the media itself or alongside the media. Alternatively a user tag could be simply a text tag that is stored in an access file along with media, e.g., a picture, a video, an audio clip, etc. For example, a plurality of user mobile endpoint devices may be configured to capture pictures in EXIF (Exchangeable Image File Format). Thus, in one embodiment tag information (e.g., user tag information) may be included in one or more of the JPEG fields per the EXIF standards. Alternatively, or in addition, in one embodiment a user definable field is created and configured to be populated with user tag information. In one embodiment, a user tag could comprise an audio clip with user commentary provided by an event-share group member to accompany a picture or video. In one embodiment, the user tag may be hidden information in a picture that may be detected by the method and made available to other systems. In the case of captured/shared media comprising music or audio files, the user tag may comprise identifying information stored in a standard format, such as audio watermarking.

In one embodiment, the method, at step 250, receives captured or shared media along with the associated user tag information. In another embodiment, the method only receives user tag information along with an indication as to which media the tag applies to. For example, a first event-share group member may receive shared media relating to the subject event (e.g., a picture taken during a soccer game) that was captured by another group member. In addition, the first group member may notice that his or her child appears in the picture and would like to "tag" the child (i.e., add a user tag that identifies the child in some way). Accordingly, the user may use an application on his or her mobile endpoint device to place a user tag on the picture that identifies the child by name. Alternatively, the first user may add a user tag that is not placed on the picture itself, but comprises text that is conveyed along with the picture. For example, the user tag may comprise a bottom, top or side caption with identifying information or commentary. In any event, the method receives and stores such user tag information along with the shared media. It should also be noted that the user tag information may be added to/associated with the subject media by the user who captures the media, or by any other user/group member who receives the media as shared media.

At step 250, the method 200 may also receive voting information pertaining to shared media or user tags. For example, a network providing event-share services to its subscribers may wish to have a mechanism whereby users posting inappropriate (e.g., undesirable) content and/or user tags may have their content blocked or even have themselves removed from an event-share group. In addition to allowing event-share group members to add their own user tags to shared media captured by other group members, the method also allows a user to vote on the content of others, e.g., whether it is appropriate or inappropriate.

For example, a certain number or percentage of event-share group members may submit votes on a particular piece of media as being inappropriate, e.g., a video clip of inappropriate behaviors by players at a game. If the number or percentage of "inappropriate" votes exceeds a configurable threshold for a particular shared media, that piece of media may be blocked and/or removed from the system.

Similarly, in the case of user tags added to captured/shared media, event-share group members may deem the comments or content of certain user tags to be inappropriate (e.g., undesirable). Thus, group members may also vote that a particular user tag is inappropriate, as opposed to the underlying media itself. In one embodiment, when the method receives a requisite number or percentage of votes indicating that a particular user tag is inappropriate (e.g., a derogatory comment about a player or the opposing team), the method will remove that user tag from the particular media to which it is attached or will block the user tag. However, in this case the captured/shared media itself will not be blocked or removed, since it is only the associated user tag that is deemed inappropriate.

In one embodiment, a member of an event-share group may be voted out of the group if the user posts inappropriate captured media or inappropriate user tags as determined by the voting of other event-share group members. For example, if a particular user posts two or three unique pieces of captured media or user tags that are each deemed to be inappropriate by members of the event-share group (e.g., each piece of captured media and/or each user tag exceeds the voting threshold required to block or remove that particular item), the method may then remove the user from the group, in addition to blocking or removing the captured media or user tags which exceeded the voting threshold for inappropriate material. In one embodiment, the method may provide a warning to an event-share group member upon the user's first or subsequent piece of captured media or user tag exceeding the voting threshold for blocking/removal. Especially since the members of event-share groups need not have any preexisting relationship with one another, by way of such embodiments, the method 200 may reasonably prevent event-share groups from being co-opted by errant users.

At step 260, in one embodiment whenever the method 200 receives newly captured media or new user tags in step 250, the method provides the newly captured media and/or new user tag information to members of the event-share group. In this manner, the event-share group members may review and enjoy media captured by other group members (i.e., shared media), as well as the perspectives of the other group members as conveyed through user tags. For example, a photo of a soccer game may be captured and shared by a parent of a player on one team (i.e., a user/event-share group member). The user may also have added a user tag indicating his or her child in the picture. Thus, in one embodiment the method receives and multi-casts the picture and/or user tag to all event-share group members. In addition, all of the participating event-share group members are given the opportunity to place their own user-generated user tags onto the shared media (e.g., the shared photo). For example, in one scenario, a player on the opposing team may be in the shared photo and other group members, e.g., the parents of the player on the opposing team, may then tag their child in the same picture with a new user tag.

In one embodiment, the captured media or new user tags are multi-cast to members of the group. In terms of bandwidth efficiency, when newly captured media is conveyed or transmitted along with its associated user tags, if any, back to the entire group of users, it is preferably in a multi-cast mode. In other embodiments, the method may distribute newly added content to event-share group users in a uni-cast mode, or a point-to-point mode. Note, however, that in the case of a large event-share group this could result in a substantial amount of messaging back and forth that could impact the system negatively in term of bandwidth.

In one embodiment, as an alternative, or in addition to automatically multi-casting newly received content or user tags to all members of the event share group upon receipt at step 260, the method may distribute the newly received content and user tags according to a schedule. For example, the method may distribute any new media or user tags only once every five minutes, or any other period of time which may comprise a configurable parameter. In another embodiment, the method does not automatically distribute newly added content and user tags to event-share group members but only distributes newly added content and user tags to particular group members upon receipt of a request to update content from a group member. Thus, some users may opt out of immediately receiving each and every newly shared media or user tag item and instead receive new media on demand, such as once every 10 minutes. In such an embodiment, a user who does not wish to be continuously interrupted with new content and user tags could still receive new content and user tags in an orderly fashion at his or her convenience.

At step 280, the method 200 determines if an event has ended. In one embodiment, the method determines an event has ended by determining that the geographic density of event-share group members has diminished below a certain predetermined threshold. For example, if an event-share group relating to a soccer match at one time has 100 members and the 100 members are located within a five-acre area (e.g., a soccer field, which is approximately two-acres and surrounding areas), thereby resulting in the density of 20 members/acre. The method may determine that the event has ended when the measured density diminishes past a certain threshold, e.g., a point where the method is reasonably certain that the event has ended. In the above scenario, the method may determine that the event has ended when the geographic separation (e.g., as indicated by the event-share group-member density) diminishes to five members/acre, or two members/acre, for example. When this condition is detected, it is likely that the members of the temporary event-share group are departing from the event or are in the process of doing so. It should be noted that the threshold used to determine when the event has ended may be adjusted as necessary, either on a per event-share group basis or on a network-wide basis, or in any other manner as necessary, in accordance with various embodiments.

In one embodiment, the method may determine that the event has ended based upon a tapering off in event-sharing activity. For example, the method may detect a decrease or stoppage in sharing of newly captured media. Alternatively, or in addition, the method may detect a decline or stoppage of user tagging activity relating to shared media. The method may also determine that an event has ended based upon a stop in new users attempting to join the group or receiving a number of requests from group members to stop participating in the event-share group. In addition, each of the above factors may have a configurable threshold which, if crossed, indicates that an event should be considered to have ended.

In one embodiment, the method may determine that an event has ended based upon a weighted combination of a plurality of any of the above factors. For example, an indication of a decline or stoppage in newly captured media may be a factor that is more strongly indicative of the end of an event whereas a decline or stop in new users attempting to join a group may be less so. Thus, in one embodiment, the determination that an event has ended can be made based upon a 75%-25% weighting of these two factors and/or their respective thresholds. It should be noted that various thresholds, and/or combinations of weightings and factors may be combined in order to determine when an event has ended.

If the event is determined to have ended at step 280, the method 200 proceeds to step 295 where the method terminates. As part of the termination process, the method may continue to store captured/shared media and user tags for a predetermined period of time after the event is determined to have ended at step 280. For example, the captured/shared media and user tags may be stored by the method for a predefined time period, e.g., 1 hour, 2 hours, one day, etc. In one embodiment, after the event is determined to have ended and during the predetermined time period, the method may permit group members to continue to access and download shared media and user tags but may no longer accept newly captured media. After the expiration of the predetermined period of time, the method will no longer store the shared media and user tags, i.e., the shared media and user tags are deleted.

Although steps of the exemplary method 200 have been described as taking place at, or being performed by an event-share server, such as AS 112, or at a S-CSCF 121, some or all of the steps may take place at, or be performed by, any other component of IMS core network 110 in FIG. 1.

Figure 3:
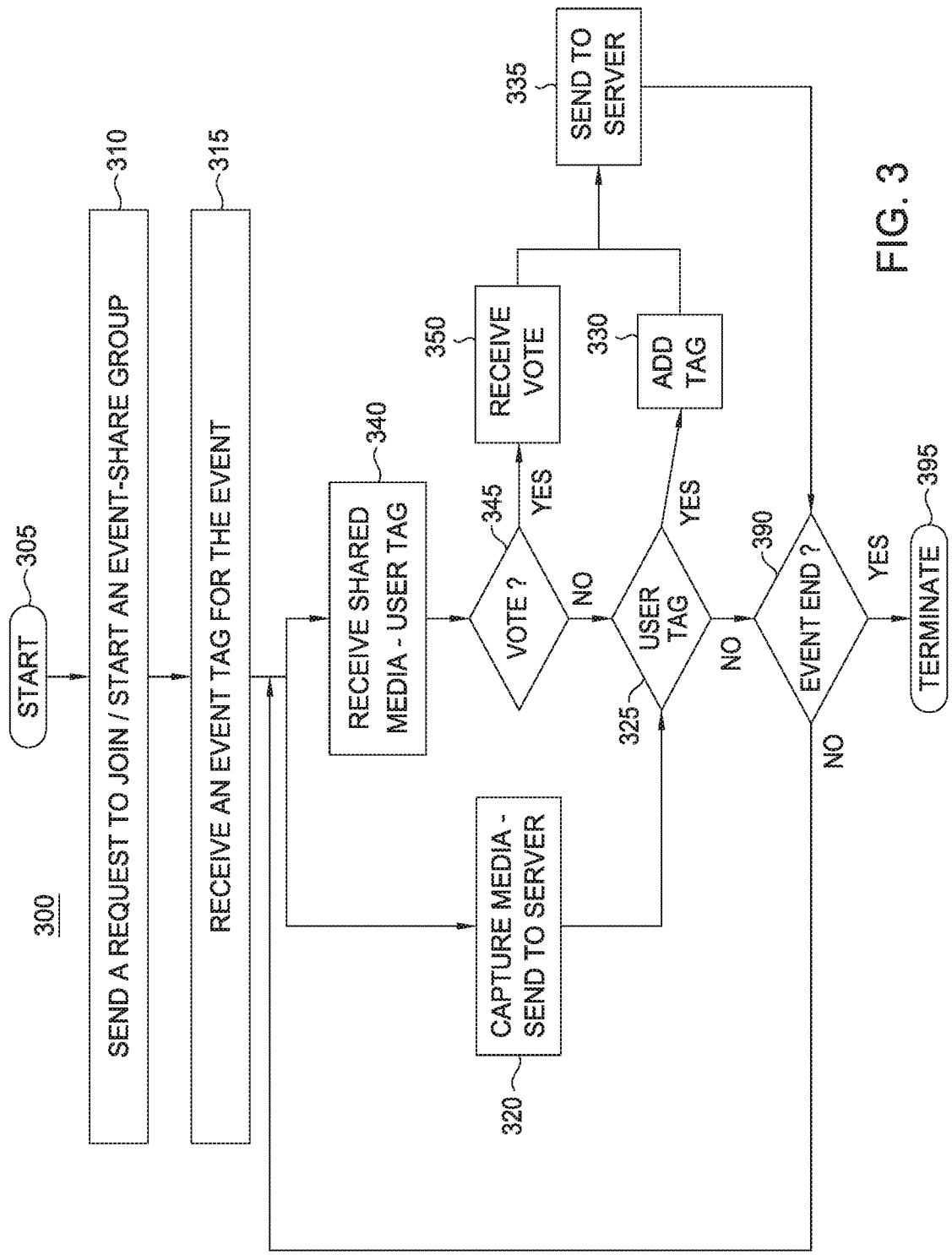
FIG. 3 illustrates a flowchart of a method for enabling users to access and participate in a collaborative event-share group.

FIG. 3 illustrates a flowchart of a method 300 for supporting and enabling collaborative media sharing among users, e.g., at an event. In one embodiment, one or more steps of the method 300 may be performed by a mobile endpoint device (e.g., a cellular phone, a mobile phone, a smart phone, and the like). In one embodiment, the mobile endpoint device preferably is equipped with a digital camera or video capture device and/or a microphone or other mechanisms of audio and video capture/recording in order to support various functions described herein. In particular, a user may be a wireless network subscriber of a wireless network provider and may be subscribed to or enrolled in an event-share service feature offered by the wireless network provider. In addition, the user's mobile endpoint device may be configured to participate in event-share media sharing as described herein. The method begins in step 305 and proceeds to step 310.

At step 310, the method 300 sends/transmits a request to join or start an event-share group relating to a particular event. For example, a user may arrive at a child's soccer game and may desire to start participating in event media sharing. This requires that the method conveys the request to join or start an event-share group relating to the soccer game (e.g., to an event-share server, such as AS 112 in FIG. 1). In one embodiment, the method may be optionally presented with a list of choices of possible event share groups that a user may wish to join (e.g., in response to transmission of a request to join or start an event-share group) if one or more event-share groups have already been created. In one embodiment, the method may further transmit a selection of one the one or more event-share groups presented for selection, or may transmit an indication that the user does not wish to join any of the possible existing event-share groups, but instead would like a new group to be created. Thus, in such scenarios the user is either added to an existing event-share group that is elected by the user, or is added as the first member of a new event-share group.

At step 315, the method receives an event tag for the event and/or event-share group. For example, an event-share server may manage an event-share group for a particular event and assign a unique event tag which identifies that particular event and/or event-share group. The event tag is intended to be included in all captured media that group members intend to share with other members of the group. In one embodiment, the method may store the received event tag for use through the duration of the existence of the event-share group. Following the receipt of the event tag at step 315 the method may proceed to either step 320 or 340.

At step 320, the method captures media relating to the event. For example, a mobile endpoint device, properly equipped or accessorized, may be used to capture digital photographs, video, audio clips, and other types of media. For example, a user who is a member of an event-share group (e.g., a parent of a child in a soccer game) may take a photograph of the game. In addition, the user may wish to share this photograph with the event-share group. At step 320, the method may also optionally send the photograph (i.e., the captured media) to an event-share server (such as AS 112 in FIG. 1) that is managing the event-share group. In this case, the method may include the event tag information received in step 315 along with the photograph so that the photograph is properly identified as being associated with the event-share group for the soccer game. Alternatively, the method may wait until step 335 to send the captured media, such as a photograph of the soccer game, to an event-share server, as described below.

At step 325, the method determines if there is any user tags to be added to any captured or shared media. For example, the method may query a user (e.g., via an interface on the user's mobile endpoint device) whether the user would like to add user tag to any media captured at step 320 or received at step 340 (as described below). If the user does intend to add a user tag, the method proceeds to step 330.

At step 330, the method 300 optionally collects and adds the user tag to the captured or shared media. For example, the method may await a user to add a user tag via a user interface (e.g., a key pad, a touch screen display, a microphone, and the like) to any shared media that is currently being shared among event-share group members. In the example where the method has captured media (e.g., a photograph of a soccer game), the method may await the input of one or more user tags, such as user tags identifying any players in the picture, or identifying himself or herself as the author of the picture. In any event, after the user inputs the desired user tag, the method adds the user tag to the appropriate shared or captured media and proceeds to step 335.

At step 335, the method conveys/transmits the user tag and the media at step 330 to the appropriate server (e.g., an event-share server, such as AS 112 in FIG. 1). The user tag may be conveyed along with an instance of the shared media to which it relates, or may be sent on its own with an indication as to which media it relates to. Therefore, if captured media was not first sent to an event-share server at step 320, the method may await any user tag information (e.g., added by the user who captured the media) before sending the captured media to the event-share server at step 335. In another embodiment, the method may simply convey another copy of the captured/shared media along with any user tags, regardless of whether the method has previously sent the captured/shared media to the event-share server. Thus, the user tag is made available to other members of the event-share group, e.g., via the event-share server. In one embodiment, the method may convey the captured/shared media and/or user tag information via an email or SMS or MMS message (e.g., to an address designated for receiving event-share media) with the media comprising an attachment to the message.

If the user declines to add any user tags at step 325, the method 300 proceeds to step 390. At step 390, the method determines if the event has ended. In one embodiment, a user may manually indicate his or her intention to end participation in an event-share group, regardless of whether the actual subject event is continuing. However, from the perspective of the method 300, if the user indicates an intention to end participation in the event-share group, the event is deemed to have ended. In this case, the method proceeds to step 395 where the method terminates.

Alternatively, at step 390 the method may determine that an event is ended if the method receives an indication that an event is ended (e.g., from an event-share server that is supporting and enabling collaborative media sharing among users at an event). For example, an event-share server may determine that the measured density of event-share group members has decreased beyond a requisite threshold. Alternatively, or in addition, the event-share server may detect a tapering-off in messaging relating to an event (e.g., less media being captured and shared, less user tagging activity, no new user attempting to join an event-share group, etc.). In these circumstances, the event-share server may convey an indication that the event has ended and that the temporary event-share group is being dissolved, which the method may receive at step 390. In this case, the method may determine that the event has ended and proceeds to step 395 where the method terminates. On the other hand, if the method does not determine that the event has ended or the event-share group has been dissolved, the method returns to step 320 or step 340.

The alternative branch of the method which includes step 320 has already been described above. Notably, this branch of the method may repeat in the same manner as previously discussed if the event/event-share group is ongoing.

In the alternative, the method 300 may proceed to step 340 where the method may receive shared media and/or user tags (e.g., from an event share server). For example, the shared media may comprise digital still photographs, video, audio clips, and other media captured by other event-share group members and the user tags may comprise user tag information added by these other event-share group members.

At step 345, the method 300 may prompt a user whether they would like to vote on any shared media or user tags. For example, a network providing event-share group functionality to its subscribers may wish to have a mechanism whereby users posting inappropriate content and/or user tags may have their content blocked or even have themselves removed from an event-share group. For example, a certain number or percentage of event-share group members may submit votes on a particular piece of media as being inappropriate (e.g., undesirable). If the number or percentage of "inappropriate" votes exceeds a configurable threshold for a particular shared media, that piece of media may be blocked and or removed from the system. Similarly, in the case of user tags added to captured/shared media, event-share group members may deem the comments or content of certain user tags to be inappropriate. Thus, group members may also vote that a particular user tag is inappropriate, as opposed to the underlying media itself.

In addition, in one embodiment a member of an event-share group may be voted out of the group if the user posts inappropriate captured media or inappropriate user tags as determined by the voting of other event-share group members. For example, if a particular user posts two or three unique pieces of captured media or user tags that are each deemed to be inappropriate by members of the event-share group (e.g., each piece of captured media and/or each user tag exceeds the voting threshold required to block or remove that particular item), the method may then remove the user from the group, in addition to blocking or removing the captured media or user tags which exceeded the voting threshold for inappropriate material. Accordingly, in one embodiment, the method may query an event-share group member whether they would like to vote on any shared media or user tags.

If answered positively, the method proceeds to step 350 where the method receives the voting information. For example, an event-share group member may indicate to the method (e.g., via a keypad entry, voice-activated response or other input) that shared media or a user tag is either appropriate or inappropriate. In one embodiment, the voting information may comprise multiple options. For example, the event-share group member may indicate that the shared media or user tag is very appropriate, somewhat appropriate, somewhat inappropriate, very inappropriate or completely unacceptable. In one embodiment, the voting information may be conveyed on a numerical scale. For example, the method may use a 1 to 5 scale with 1 being completely unacceptable and 5 being very appropriate.

Following receipt of the voting information at step 350, the method proceeds to step 335. At step 335, the method may also convey/transmit the received voting information (e.g., to an event-share server), in addition to conveying any captured media or any user tag information as described above. However, if at step 345 the method does not receive an indication that the user would like to add voting information to any captured media or user tags, the method proceeds to step 325, as described above.

It should be noted that although not specifically specified, one or more steps of methods 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step.

Figure 4:
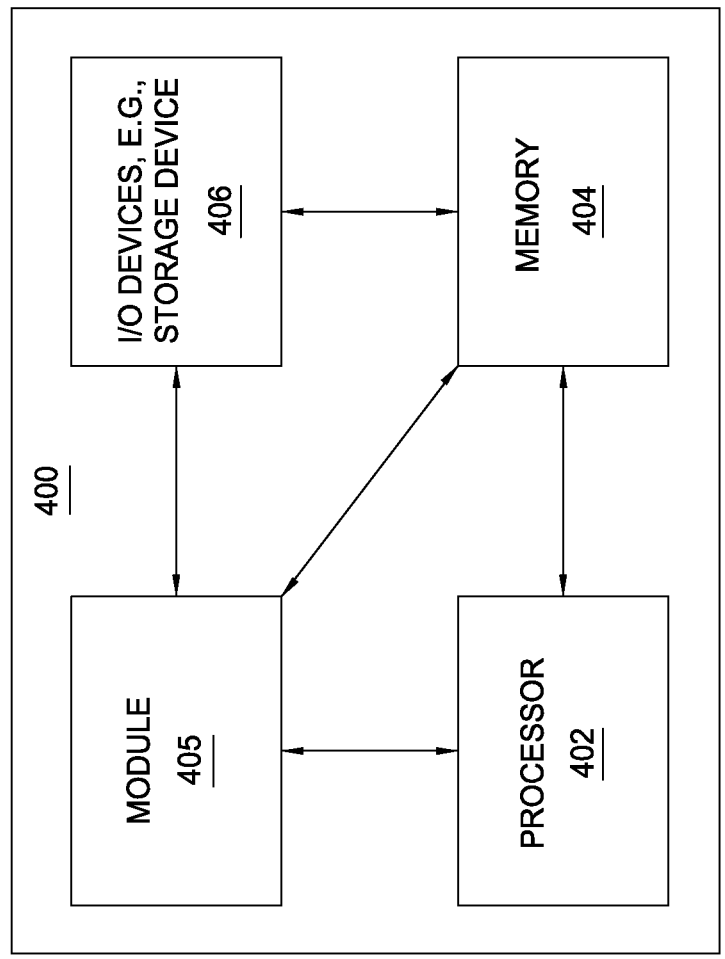
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for supporting and enabling collaborative media sharing among users, e.g., at an event, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for supporting and enabling collaborative media sharing among users at an event can be loaded into memory 404 and executed by processor 402 to implement the functions as discussed above. As such, the present method 405 for supporting and enabling collaborative media sharing among users at an event (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus comprising:
a processor; and
a computer-readable storage medium storing a plurality of instructions which, when executed by the processor, cause the processor to perform operations, the operations comprising:
sending a request to an application server of a communication network to create an event-share group, wherein the event-share group is related to an event having a plurality of members, wherein the application server is operated by a service provider of an event-share service feature;
receiving an event tag, where the event tag uniquely identifies the event-share group;
receiving a captured media with the event tag from the application server, wherein the captured media was captured by an endpoint device of a member of the plurality of members; and
presenting the event tag in a user-selected format along with the captured media, via a mapping of the user-selected format to the event tap that is maintained by the processor.

2. The apparatus of claim 1, wherein the captured media is associated with user tag information.

3. The apparatus of claim 2, wherein the user tag information is created by the member who captured the captured media.

4. The apparatus of claim 2, wherein the user tag information is created by a member who is receiving the captured media.

5. The apparatus of claim 2, wherein the user tag information comprises information that is customizable by the plurality of members.

6. The apparatus of claim 1, further comprising:
receiving a notification from the application server that the event-share group is terminated in response to an indication of an end of the event.

7. The apparatus of claim 6, wherein the indication comprises a detection of a geographic separation of the plurality of members.

8. The apparatus of claim 1, wherein the communication network comprises an internet protocol multimedia subsystem network.

9. The apparatus of claim 1, wherein the captured media is stored by the application server deployed in the communication network.

10. The apparatus of claim 9, wherein user tag information associated with the captured media is stored by the application server.

11. The apparatus of claim 1, wherein the request to create the event-share group is verified by the application server that a user sending the request has subscribed to the event-share service feature prior to providing the event tag.

12. The apparatus of claim 1, further comprising:
sending voting information pertaining to the captured media indicative of whether the captured media comprises undesirable content.

13. A tangible computer readable storage medium storing instructions which, when executed by a processor, causes the processor to perform operations, the operations comprising:
sending a request to an application server of a communication network to create an event-share group, wherein the event-share group is related to an event having a plurality of members, wherein the application server is operated by a service provider of an event-share service feature;
receiving an event tag, where the event tag uniquely identifies the event-share group;
receiving a captured media with the event tag from the application server, wherein the captured media was captured by an endpoint device of a member of the plurality of members; and
presenting the event tag in a user-selected format along with the captured media, via a mapping of the user-selected format to the event tag that is maintained by the processor.

14. A method comprising:
sending, by a processor, a request to an application server of a communication network to create an event-share group, wherein the event-share group is related to an event having a plurality of members, wherein the application server is operated by a service provider of an event-share service feature;
receiving, by the processor, an event tag, where the event tag uniquely identifies the event-share group;
receiving, by the processor, a captured media with the event tag from the application server, wherein the captured media was captured by an endpoint device of a member of the plurality of members; and
presenting, by the processor, the event tag in a user-selected format along with the captured media, via a mapping of the user-selected format to the event tag that is maintained by the processor.

15. The method of claim 14, wherein the captured media is associated with user tag information.

16. The method of claim 15, wherein the user tag information is created by the member who captured the captured media.

17. The method of claim 15, wherein the user tag information is created by a member who is receiving the captured media.

18. The method of claim 14, further comprising:
receiving, by the processor, a notification from the application server that the event-share group is terminated in response to an indication of an end of the event.

19. The method of claim 14, wherein the request to create the event-share group is verified by the application server that a user sending the request has subscribed to the event-share service feature prior to providing the event tag.

20. The method of claim 14, further comprising:
sending, by the processor, voting information pertaining to the captured media indicative of whether the captured media comprises undesirable content.

* * * * *